US011601071B1

(12) United States Patent
Yu et al.

(10) Patent No.: US 11,601,071 B1
(45) Date of Patent: Mar. 7, 2023

(54) TATTOO-LIKE STRETCHABLE TRIBOELECTRIC NANOGENERATOR FOR ENERGY HARVESTING

(71) Applicant: City University of Hong Kong, Hong Kong (CN)

(72) Inventors: Xinge Yu, Hong Kong (CN); Yiming Liu, Hong Kong (CN); Tsz Hung Wong, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 0 days.

(21) Appl. No.: 17/484,522

(22) Filed: Sep. 24, 2021

(51) Int. Cl.
*H02N 1/04* (2006.01)
(52) U.S. Cl.
CPC ..................... *H02N 1/04* (2013.01)
(58) Field of Classification Search
CPC ........................................................ H02N 1/04
USPC .................................................. 310/309, 310
See application file for complete search history.

(56) References Cited

U.S. PATENT DOCUMENTS

| | | | | |
|---|---|---|---|---|
| 2016/0266406 | A1* | 9/2016 | Meyers | G02C 7/049 |
| 2017/0173262 | A1* | 6/2017 | Veltz | G16H 20/17 |

FOREIGN PATENT DOCUMENTS

DE      7438426      *   8/1976   ........... A61N 1/0492

OTHER PUBLICATIONS

An epidermal sEMG tattoo-like patch as a new human-machine interface for patients with loss of voice (Year: 2020).*
An et al., Self-powered gold nanowire tattoo triboelectric sensors for soft wearable human-machine interface. Nano Energy, 2020. 77: p. 105295.
Liu et al., An epidermal sEMG tattoo-like patch as a new human-machine interface for patients with loss of voice. Microsystems & Nanoengineering, 2020. 6(1): p. 1-13.
Gong et al., Tattoolike polyaniline microparticle-doped gold nanowire patches as highly durable wearable sensors. ACS applied materials & interfaces, 2015. 7(35): p. 19700-19708.
Xu et al., Portable and wearable self-powered systems based on emerging energy harvesting technology. Microsystems & Nanoengineering, 2021. 7(1): p. 1-14.
Matsunaga et al., High-output, transparent, stretchable triboelectric nanogenerator based on carbon nanotube thin film toward wearable energy harvesters. Nano Energy, 2020. 67: p. 104297.

* cited by examiner

*Primary Examiner* — Ahmed Elnakib
(74) *Attorney, Agent, or Firm* — S&F/WEHRW

(57) ABSTRACT

The present disclosure provides an ultrathin, flexible, and tattoo-like triboelectric nanogenerator (TENG) with a well-designed aesthetic pattern. The tattoo-like TENG as an energy harvester can provide not only an aesthetic pattern, but also various practical applications. With the rising acceptance of people towards the tattoo, the tattoo-like TENG offers an alternative tattoo-like epidermal electronics covering traditional tattoo's advantages and further carries out other potential applications.

14 Claims, 11 Drawing Sheets

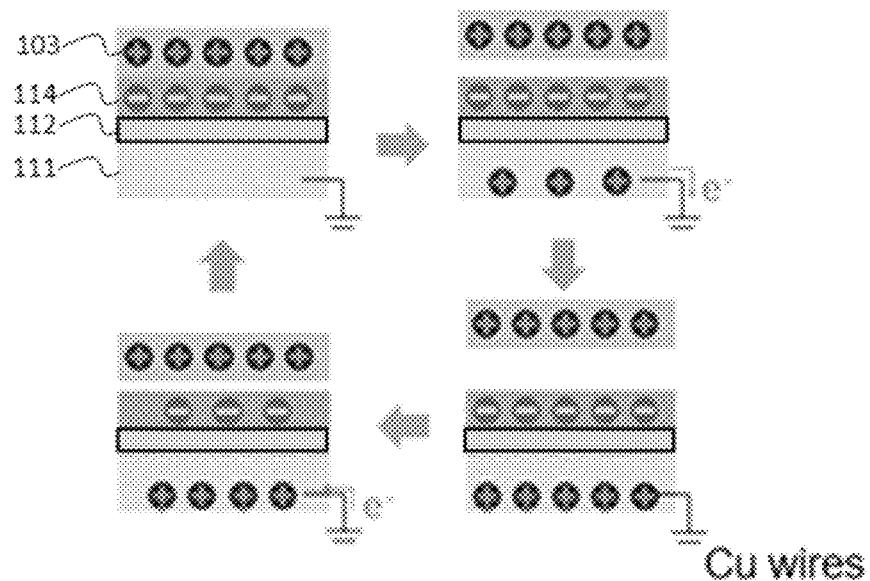
Fig. 1C
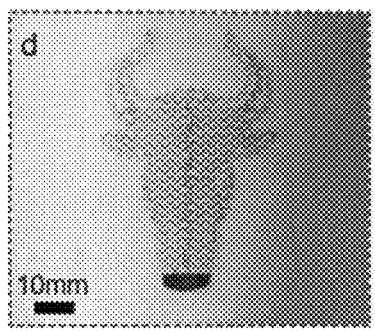 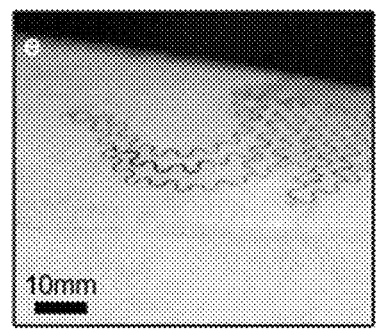 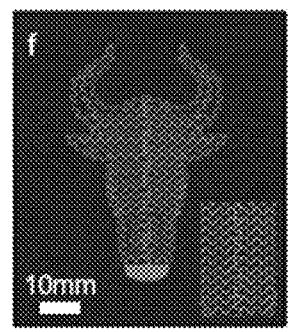
Fig. 1D　　　　　Fig. 1E　　　　　Fig. 1F
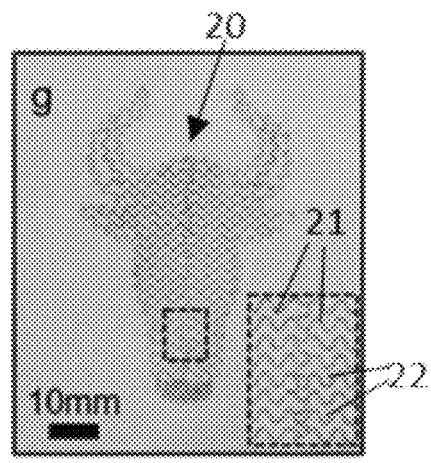
Fig. 1G Moon Flower Butterfly

TATTOO-LIKE STRETCHABLE TRIBOELECTRIC NANOGENERATOR FOR ENERGY HARVESTING

TECHNICAL FIELD

The invention is related to a tattoo-like triboelectric nanogenerator for mechanical energy harvesting.

BACKGROUND

Self-powering technologies have been a more preferential energy supply in wearable electronics, and triboelectric nanogenerator (TENG) is one of the prominent technologies due to its high flexibility, stretchability, high energy density, and tiny size. However, the thickness of conventional TENG is limited by the thickness of polydimethylsiloxane (PDMS), and the metallic patterns of the TENG are primarily designed in a dense structure for higher stretchability and energy output without aesthetic meaning.

Tattoos can be regarded as an expression of personal style or fashion accessories, which more and more people are accepting and willing to have tattoos, especially teenagers. However, with the increasing rate of people with tattoos, the percentage of people who regard having a permanent tattoo also raises. This implies that a non-permanent tattoo could be more favorable among tattoo lovers.

Tattoo is an enduring trend among teenagers who believe a fancy tattoo could express their personality. Only their color and pattern could be selected for the traditional tattoos, but they do not own any practical daily applications.

SUMMARY

The present disclosure provides an ultrathin, flexible, and tattoo-like TENG with a well-designed aesthetic pattern. For the present tattoo-like TENG as an energy harvester, not only the pattern can be designed, but also there are other applications, e.g., acting as the power source and turn the tattoo into a "shinning tattoo," or further human-machine interface. With the rising acceptance of people towards the tattoo, the tattoo-like TENG offers an alternative tattoo-like epidermal electronics covering traditional tattoo advantages and carries out other potential applications.

Provided herein is a triboelectric nanogenerator comprising: a first patterned polyimide (PI) film, a second patterned PI film; a patterned copper (Cu) layer sandwiched between the first patterned PI film and the second patterned PI film, the patterned Cu layer having a tattoo-like pattern for providing an aesthetic outlook to the triboelectric nanogenerator and enhancing user's experience; and a polydimethylsiloxane (PDMS) film for covering the first patterned PI film.

In certain embodiments, the triboelectric nanogenerator further comprises an adhesion layer for connecting the second patterned PI film to a skin of a user.

In certain embodiments, the patterned Cu layer has a serpentine structure comprising a plurality of serpentine Cu lines and a plurality of grooves, each groove being located between two respective serpentine Cu lines, the plurality of serpentine Cu lines being electrically connected and arranged to form the tattoo-like pattern.

In certain embodiments, the first patterned PI film has a pattern same as the tattoo-like pattern.

In certain embodiments, the second patterned PI film has a pattern same as the tattoo-like pattern.

In certain embodiments, each of the first patterned PI film and the second patterned PI film has a pattern same as the tattoo-like pattern.

In certain embodiments, the tattoo-like pattern covers 5% to 15% of an area of the PDMS film.

In certain embodiments, the adhesion layer is formed from a liquid bandage.

In certain embodiments, the Cu layer has a thickness of 100 µm to 300 µm; the PDMS film has a thickness of 40 µm to 80 µm; and the adhesion layer has a thickness of 1 µm to 5 µm.

In certain embodiments, the tattoo-like pattern has a shape of a Chinese zodiac, butterfly, flower or moon.

Provided herein is a system for energy harvesting comprising: the triboelectric nanogenerator described above; and a cloth for providing contact and separation between the cloth and the PDMS film.

In certain embodiments, the system further comprises a rectifier bridge for electrically connecting to the patterned Cu layer via an electrically conducting wire.

In certain embodiments, the cloth comprises cotton, polymer fiber or nylon.

In certain embodiments, the system further comprises one or more lighting device for being powered by the triboelectric nanogenerator.

Provided herein is a method for energy harvesting comprising: providing the triboelectric nanogenerator described above, wherein the triboelectric nanogenerator is mounted on a skin of a user via the adhesion layer; and generating contact and separation between a cloth and the PDMS film under a motion of the user for turning mechanical energy from the motion into electrical energy.

In certain embodiments, the skin is on an arm of the user, a chest of the user, a back of the user, a tummy of the user or a thigh of the user.

In certain embodiments, the motion is walking, running, jumping, squatting, squat jumping or a combination thereof.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which:

FIG. 1C shows a schematic diagram of the working principles of the tattoo-like TENG;

FIG. 1D shows an optical image of a cow-tattoo TENG mounted on a human skin surface according to certain embodiments;

FIG. 1E shows a side view of the optical image of the cow-tattoo TENG mounted on a human skin surface;

FIG. 1F shows a design diagram of the cow-tattoo TENG and its enlarged area;

FIG. 1G shows an image of the cow-tattoo TENG mounted on a PDMS and its enlarged area;

Skilled artisans will appreciate that elements in the figures are illustrated for simplicity and clarity and have not necessarily been depicted to scale.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Certain embodiments provide a skin-integrated tattoo-like TENG comprising several major layers, including a patterned copper (Cu) layer, two patterned polyimide (PI) films, an adhesion layer formed from liquid bandage (LB) and PDMS films. The patterned copper layer, acting as the conductive layer, is designed in serpentine structures and composing in the shapes of the 12 signs of the zodiac. The patterned copper layer is clamped in between the two patterned PI films in an identical form, which provide robust mechanical support. On the top surface, a PDMS film is placed as the encapsulation, with this ultrathin PDMS encapsulation (e.g., ~60 μm), the underneath components are well protected at the lowest layer, liquid bandage is sprayed onto the epidermal surface acts as glutinous connection between tattoo-like TENG and skin, the entire device presents an outstanding mechanical tolerance towards twisting, bending, stretching, and even rubbing.

The reliable performance of the present tattoo-like TENG is shown by attaching to five different body positions of a volunteer, then five movements are conducted by the volunteer, and the corresponding electrical signals are recorded. All five tattoo-like TENGs demonstrate clear responses to body movement, indicating the potentiality in the energy harvesting from daily human motions. Furthermore, to test the energy collecting capability of the tattoo-like TENG, it is applied as the power source of a series of LED lights. With the aid of a rectifier bridge and under a continuous gentle tapping of the tattoo-like TENG, over 50 LED lights are lit up. In addition, an arrow-like TENG is designed and applied in robotic vehicle control. With Arduino programs and a control system, the volunteer could control a robotic vehicle and perform some basic movements, like moving forward and backward, turning around, and stopping by tapping the arrow-like TENG mounted on his forearm. With these characteristics, the tattoo-like TENG demonstrates great potential in energy harvesting and the human-machine interface.

Figure 1A:
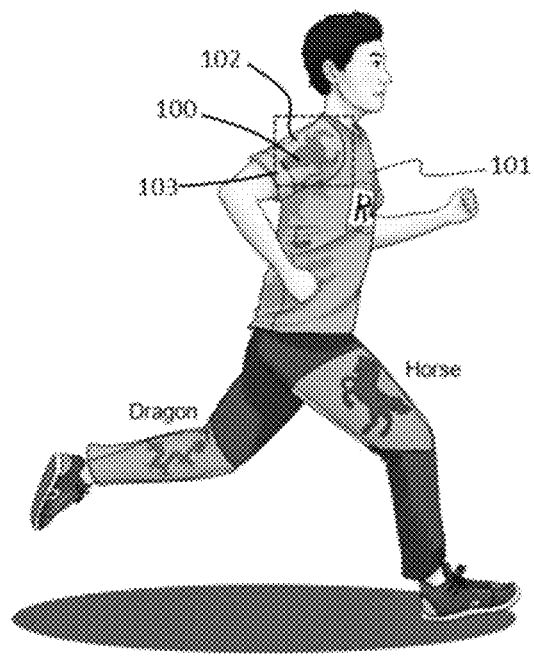
FIG. 1A shows presentation of a tattoo-like TENG mounted on a human skin surface and harvesting energy during running according to certain embodiments.

The tattoo-like TENG 100 brings an idea of gorgeous energy harvester, which could be mounted onto the human skin surface 102 of a person 101 under a cloth 103 as shown in FIG. 1A, like traditional tattoo stickers. The mechanical energy, generated by daily human motions, like walking, running or jumping, would lead to a continuous contact and separation between their cloths and skin. This tattoo-like TENG is capable of collecting this mechanical energy and turning it into electrical energy.

Figure 1B:
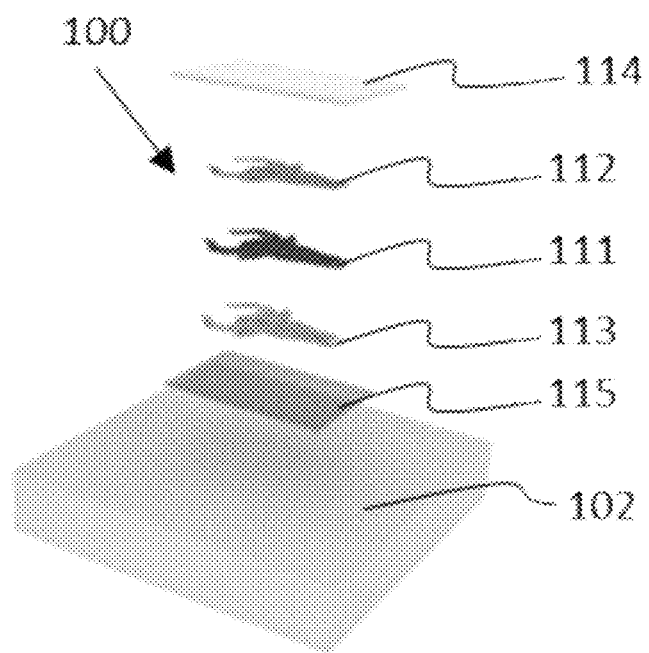
FIG. 1B shows schematic illustration of the tattoo-like TENG.

As shown in FIG. 1B, a tattoo-like TENG 100 comprises a patterned Cu layer 111, two patterned PI films 112, 113, a PDMS film 114 and an adhesion layer 115. The patterned Cu layer 111 and two patterned PI films 112, 113 have the same tattoo-like pattern and connected in a sandwich structure, in which the patterned Cu layer 111 is sandwiched between the two patterned PI films 112, 113. The PDMS film 114 covers the patterned PI film 112 such that the patterned PI film 112 is located between the PDMS film 114 and the patterned Cu layer 111. The adhesion layer 115 connects the patterned PI film 113 to the human skin surface 102 such that the patterned PI film 113 is located between the adhesion layer 115 and the patterned Cu layer 111.

The fabrication process of the tattoo-like TENG 110 is shown as follows according to certain embodiments. In the beginning, a thin layer of poly (methyl methacrylate) (PMMA) is spin-coated onto a piece of glass chip (75 mm×50 mm) and then baked at 200° C. The thin PMMA layer and the glass chip act as the sacrificial and mechanical support, respectively. Next, a layer of polyimide (PI) is spin-coated on top of that glass chip (~2 µm thick) and then baked at 250° C. acts the mechanical support of the entire device. When all the materials on the grass chip are dried, a thin layer of the copper (~200 µm thick) is sputtered on top of the glass chip. This copper layer demonstrates the key characteristics of the conductive layer and the outward appearance of the tattoo-like TENG. Once the copper layer is completely sputtered on the glass chip, it is ready for the photolithography step, turning the large, rectangular copper layer into the desired shapes of the 12 signs of the zodiac. Before the photolithography step, the glass chip is cleaned by DI water, ethanol, and acetone, respectively, to remove the tiny impurities stuck on its surface. Once the glass chip is cleaned, a layer of photoresist gel is spin-coated and then baked at 115° C. for 5 min, and then it is sent to be exposed under ultraviolet (UV) light, with a mask inserted in between the glass chip and the light source. The masks are engraved with different patterns in the shape of 12 signs of the zodiac that it is applied for blocking the UV light at specific regions. Then the glass chip is immersed into the mixture solution of developer and DI water to dissolve the photoresist gel, which is exposed under the UV light while the photoresist gel blocked by the mask would not be dissolved. DI water is then applied for rinsing the glass chip to remove the dissolved photoresist gel and baked at 115° C. for another 5 min. To etch the superfluous copper regions, an iron (III) oxide solution is applied. Those copper without the coverage of the photoresist gel would be dissolved, and it eventually appears the target appearance, identical to the mask. To turn the PI layer into the same shape, reactive-ion etching is conducted that the undissolved photoresist gel would protect the underneath PI layer while the uncovered PI region would be etched. Finally, the photoresist gel would be dissolved with acetone, and the glass chip is rinsed with DI water. Finally, the Cu-PI layer in a specific shape is manufactured.

To enhance the mechanical tolerance of the tattoo-like TENG, especially the Cu layer, a sandwich structure of PI-Cu-PI is applied, that the second layer of PI is manufactured by the same steps of the first layer. To separate the glass chip and its above PI-Cu-PI layer, the underneath sacrificial PMMA layer is dissolved by immersed in the acetone solution. Afterwards, the PI-Cu-PI layer could be stuck up by a water-soluble tape for future transfer printing.

On the other hand, polydimethylsiloxane (PDMS) is used as the outermost encapsulation layer, where one of the highlights of this tattoo-like TENG comes from its ultra-thin PDMS encapsulation. The PDMS is mixed well with its crosslink at the ratio of 30:1; after it is bumped in vacuum to eliminate the bubbles, it is spin-coated on a thin layer of polyvinyl alcohol (PVA) (~60 µm thick), baked at 70° C. for 20 min. PVA is a water-soluble synthetic polymer, which acts as mechanical support of its above PDMS and will be further dissolved in water and left the ultra-thin PDMS.

Once the above materials are prepared, they can be applied to the human epidermal surface. At first, a thin layer of liquid bandage (3M Nexcare™) (~1 µm) is sprayed onto the skin surface as the adhesion layer. This thin and sticky layer acts as the connection between the skin and the PI-Cu-PI layer that the water-soluble tape is placed on the liquid bandage with the PI-Cu-PI layer facing downwards. After the sprayed liquid bandage dries and the water-soluble tape is tightly stuck onto the skin, deionized water (DI water) is applied to dissolve the water-soluble tape, and only the PI-Cu-PI layer would be left on the skin, that it is similar to the traditional tattoo stickers. On top of the PI-Cu-PI layer, the PDMS-PVA layer would be placed on it with the PDMS facing downwards; then, DI water is applied again to dissolve the PVA and left the ultrathin PDMS as the encapsulation of the entire device. With the protection of the PDMS thin layer, the tattoo-like TENG owns high mechanical tolerance and mechanical properties which could be tightly mounted on the skin surface.

The working principle of the tattoo-like TENG is presented in FIG. 1C. When external forces are applied on the tattoo-like TENG, electrical signals would be generated between the tribo-materials in a single electrode pattern, based on the triboelectric effect. Due to an externally applied force, two materials, the cloth 103 and the ultra-thin PDMS 114, are brought in contact, and there are charge transfers. Once the two contacted materials are separated, there is an electric potential difference between them, resulting in an instantaneous generated electric current to flow from the ground to the patterned Cu layer 111 via Cu wires. The charges are in equilibrium when the two materials are entirely separated. Thus, a continuous output current could be derived from such repeated contact-separate motions.

With the aid of the topmost PDMS, the tattoo-like TENG could be tightly mounted on human skin surface (FIG. 1D) and would not be easily flaked, and its ultra-thin properties (FIG. 1E) would not cause any inconvenience and discomfort during daily body motions. With proficient photolithography skills, the final product of the tattoo-like TENG could be identical to its design, which indicates that there are significant potentials in designing any type of tattoo and turn them into the tattoo-like TENG.

Figure 2B:
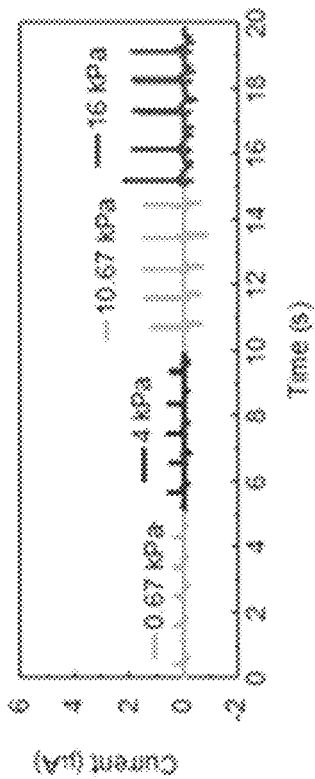
FIG. 2B shows the short-circuit current generated by the tattoo-like TENG under different stress intensities at a constant frequency of 1 Hz.
Figure 2D:
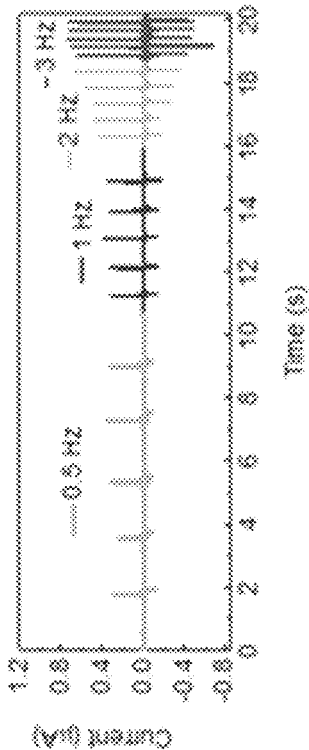
FIG. 2D shows the short-circuit current generated by the tattoo-like TENG under different frequency at a constant stress intensity of 4 kPa.
Figure 2A:
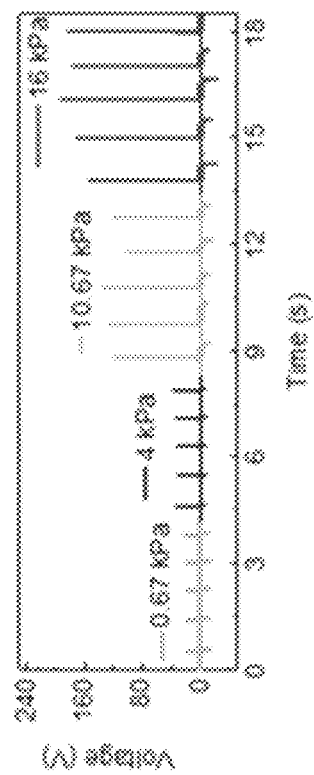
FIG. 2A shows the open-circuit voltage generated by a tattoo-like TENG under different stress intensities at a constant frequency of 1 Hz.

FIGS. 2A-2G show the electrical characteristics of the tattoo-like TENG. The electrical performance of the tattoo-like TENG is one of the important parameters for the present invention. The tattoo-like TENG is mounted on a thick PDMS, representing the artificial skin, to study its open-circuit voltage and short-circuit current under different stresses and frequencies. Its detailed open-circuit voltage and short-circuit current are shown in FIG. 2A and FIG. 2B respectively, experienced increasing stress from 0.67 kPa to 16.67 kPa at the frequency of 1 Hz. Its open-circuit voltage increases from 17.4V to 192.6V, and its short-circuit current gains from 0.31 µA to 2.16 µA, respectively. These outstanding electrical performances indicate the high capability of the energy harvesting function of the tattoo-like TENG. On the other hand, apart from the changing intensities, the impact of change in contact-separation frequency towards the tattoo-like TENG's electrical performance is studied.

Figure 2C:
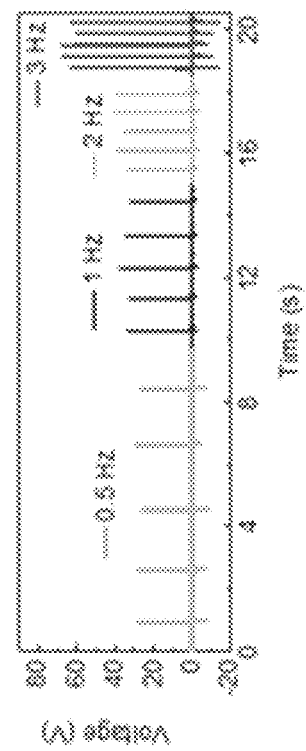
FIG. 2C shows the open-circuit voltage generated by the tattoo-like TENG under different frequency at a constant stress intensity of 4 kPa.
Figure 2G:
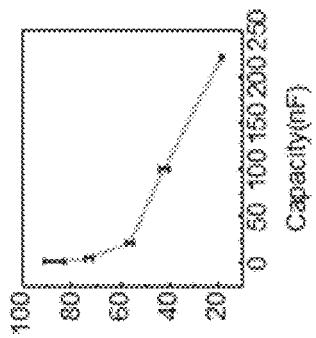
FIG. 2G shows the peak voltage of the tattoo-like TENG under a constant stress intensity of 4 kPa as a function of capacitance.
Figure 2F:
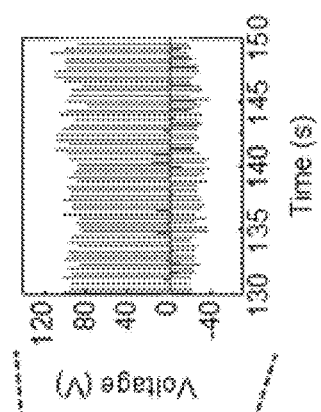
FIG. 2F shows the open-circuit voltage of the tattoo-like TENG under a constant stress of 10 kPa after hundreds of cycles and its enlarged area.
Figure 2E:
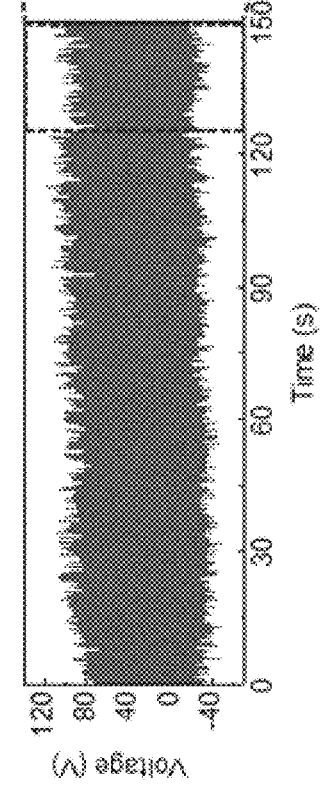
FIG. 2E shows the open-circuit voltage of the tattoo-like TENG under a constant stress of 10 kPa under cycles.

The detailed open-circuit voltage and short-circuit current are shown in FIG. 2C and FIG. 2D respectively. Experiencing a series of tapping at a constant stress intensity of 4 kPa but increasing frequency from 0.5 Hz to 3 Hz, the open-circuit voltage shows an increasing trend from 26.36V to 67.8V and short-circuits current also demonstrates a rising trend from 0.3 μA to 0.69 μA. These results prove that the tattoo-like TENG's output electrical signals can be altered by the frequencies and the intensities of the applied external forces, that the performance of harvesting energy from daily body movements is studied later. As an energy harvester mounted on the human skin, its outstanding durability is highly essential. Therefore, a cycling test is applied on the tattoo-like TENG as shown in FIGS. 2E and 2F. Under a continuous tapping motion, it is proved that its operational performance is almost unaltered after 500 tapping motions, and it shows a consistent voltage output. Finally, to test its charging capability, different capacitors are applied to test their corresponding output voltage under constant tapping motions. As shown in FIG. 2G, the applied capacitors range from 1 nF to 220 nF and the output voltage drops from 87.5V to 18.6V, which proves that the smaller volume of the capacitor, the tattoo-like TENG could release the higher voltage.

Figure 3C:
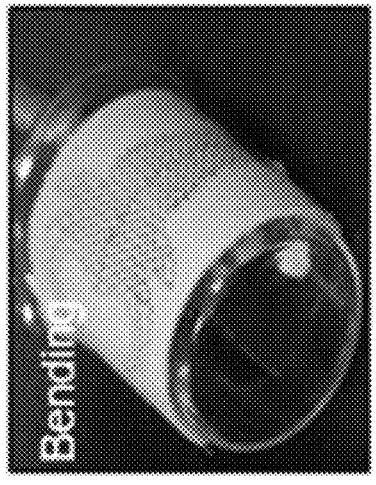
FIG. 3C shows an optical image of the tattoo-like TENG under bending.
Figure 3B:
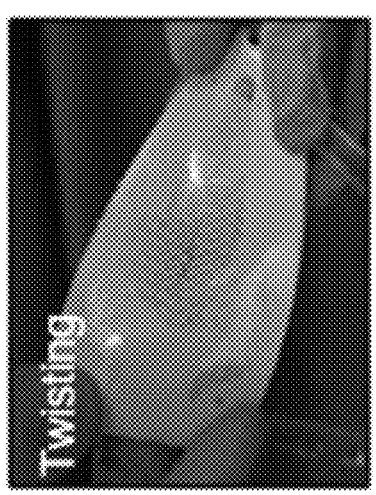
FIG. 3B shows an optical image of the tattoo-like TENG under twisting.
Figure 3A:
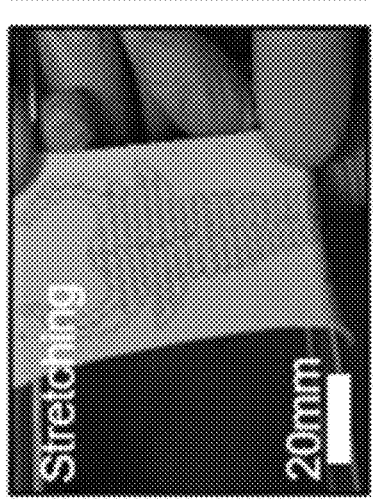
FIG. 3A shows an optical image of the tattoo-like TENG under stretching.
Figure 4A:
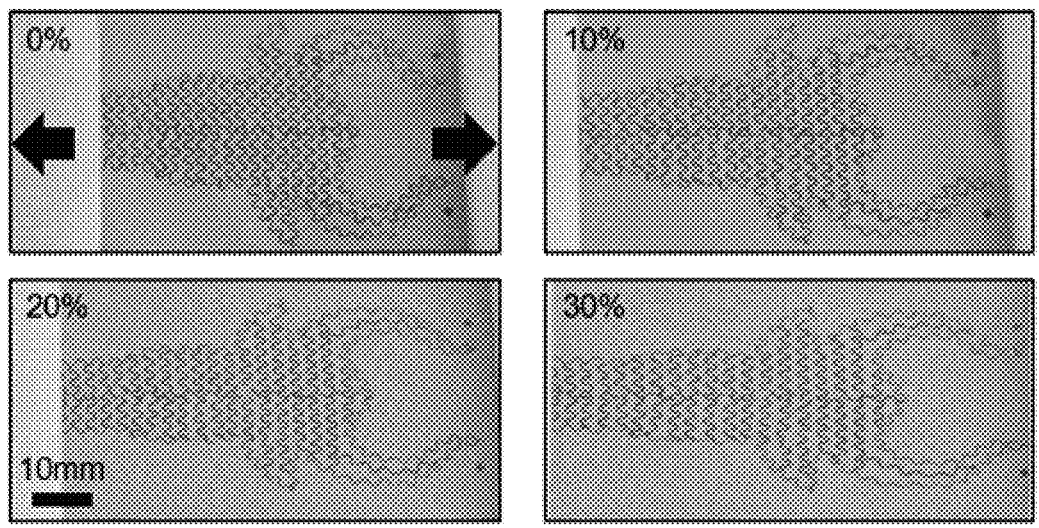
FIG. 4A shows an optical image of the tattoo-like TENG under stretching from 0%-30%.
Figure 4B:
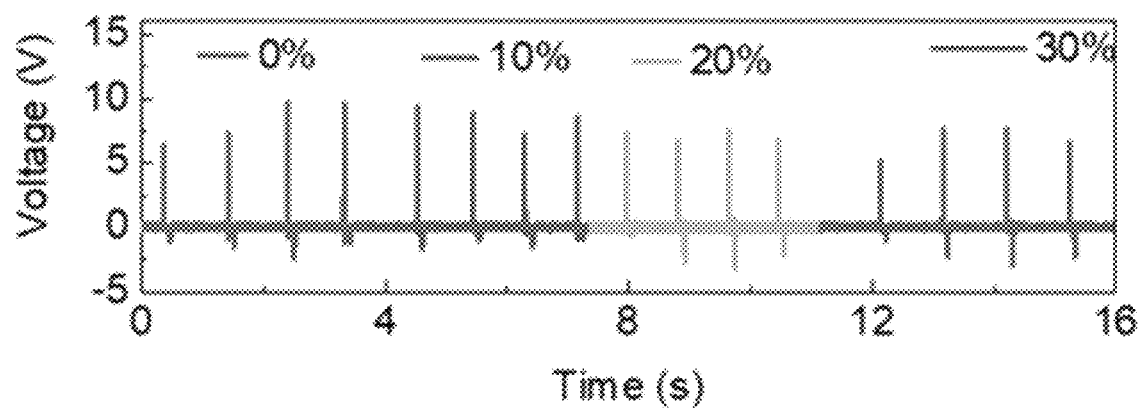
FIG. 4B shows the open-circuit voltage of the tattoo-like TENG under stretching from 0%-30%.

As the tattoo-like TENG is mounted on human skin and harvesting energy from daily human motions, its mechanical properties are further studied. Combining the soft PDMS and the well-designed tattoo pattern, the tattoo-like TENG is able to be deformed in different dimensions, like stretching, twisting, and bending (FIGS. 3A-3C). The high flexibility in deformation provides the potential of mounting on different body parts and create various types of the tattoo. Apart from its flexibility, the tattoo pattern is well designed that all lines are in the serpentine structure (FIGS. 1D-1G), which spares the room for deformation. Referring to FIG. 1G, a patterned Cu layer 20 has the serpentine structure including serpentine Cu lines 21 and grooves 22. The groove 22 is located between two serpentine Cu lines 21, the serpentine Cu lines 21 are electrically connected and arranged to form the cow-like pattern. Therefore, under large deformations, the curved serpentine copper lines and PI deform along with the external forces and would not be broken and further become invalid. In the stretching test (FIGS. 4A and 4B), the tattoo-like TENG is stretched from 0% to 30%, and it is observed that the copper wires deform with the horizontal stretching force and the operational performance is almost unaffected.

Figure 5:
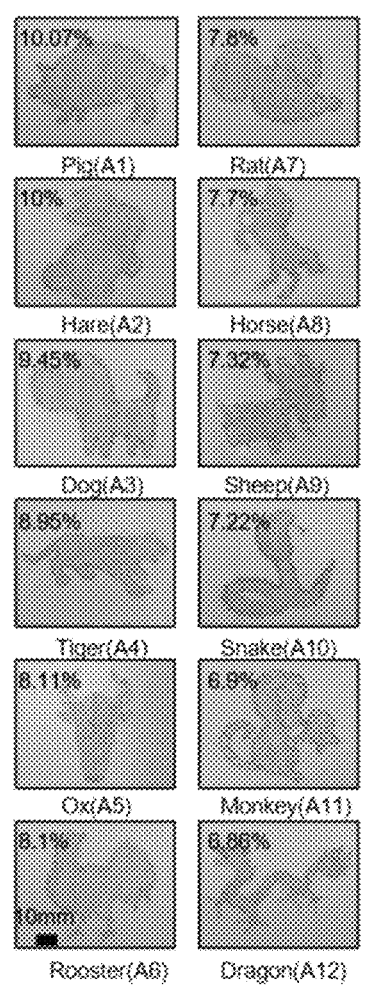
FIG. 5 shows an optical image of tattoo-like TENGs in a series of the Chinese Zodiac and their corresponding area percentage.
Figure 6:
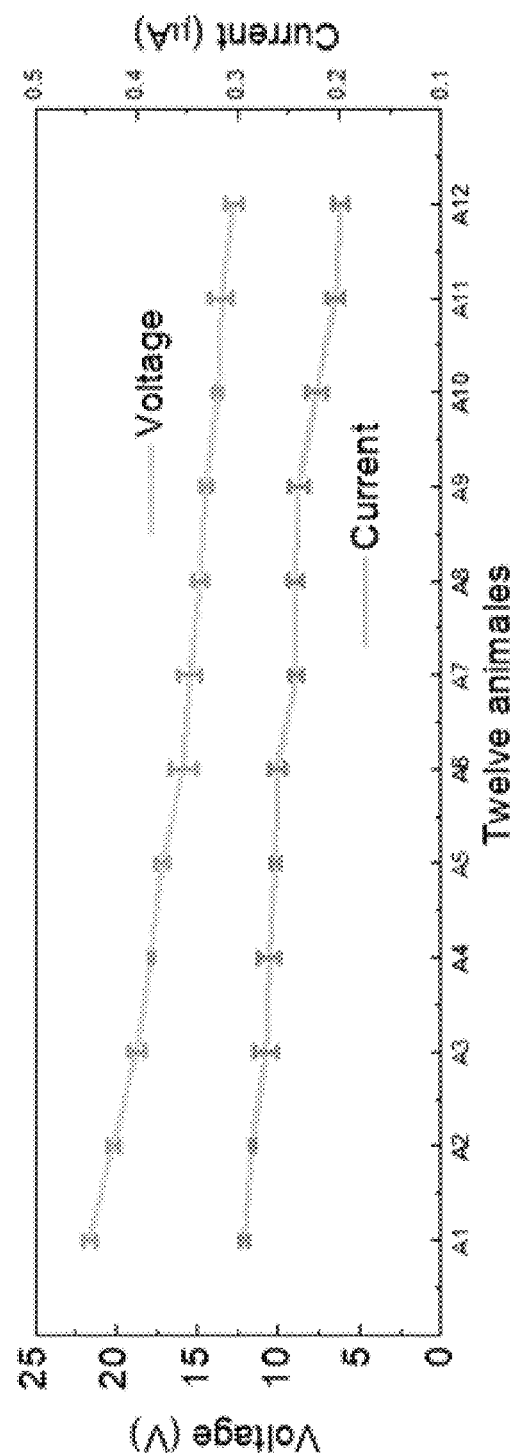
FIG. 6 shows the open-circuit voltage and short-circuit current generated by the 12 tattoo-like TENGs under constant stress intensities of 0.67 kPa at a constant frequency of 1 Hz.
Figure 10:
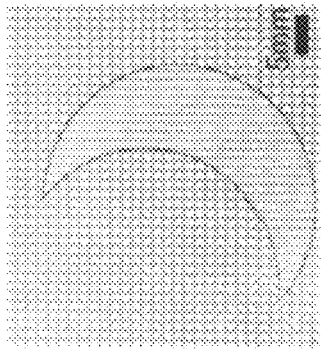
FIG. 10 shows images of the tattoo-like TENG in the design of butterfly, flower and moon.
Figure 10:
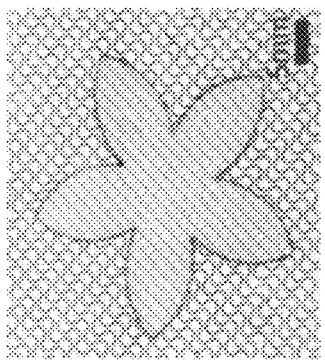
Figure 10:
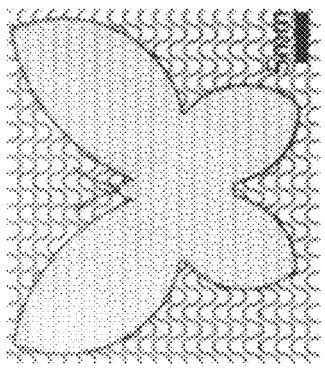

There is a high diversity of the tattoo-like TENG, with the vital principle of the application of serpentine design, there could be a series of tattoo pattern designs. As shown in FIG. 5, a group of life-like animal patterns, which are the Chinese Zodiac, is introduced. All of them are designed in serpentine wires to guarantee their flexibility and the number at the corner represents their pattern coverage on a 75 mm×50 mm PDMS. The size of the metal pattern would be proportional to its electrical performance, the open-circuit voltage and short-circuit current of the twelve Chinese Zodiac pattern is tested. It proves that the electrical performance drop with the pattern coverage (FIG. 6). Apart from the twelve Chinese Zodiac patterns, other patterns, e.g., butterfly, flower, and moon (FIG. 10). It is proved that the tattoo-like TENG owns a high universal property, and it is feasible to design different patterns.

Figure 7A:
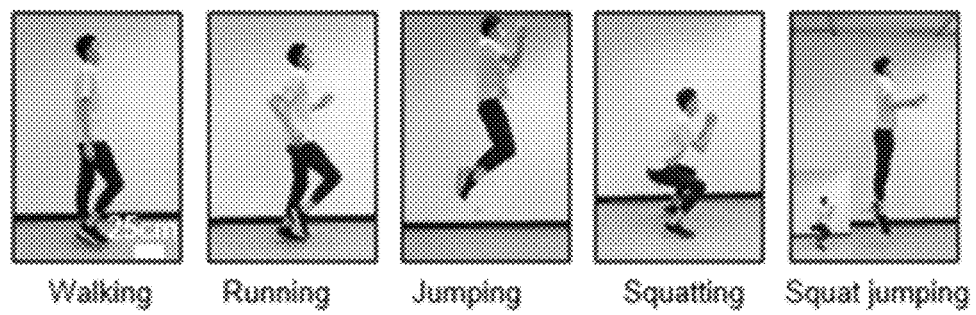
FIG. 7A shows optical images of a cow-tattoo TENG mounted on a human epidermal surface and perform different motions (walking, running, jumping, squatting, and squat jumping respectively)
Figure 7B:
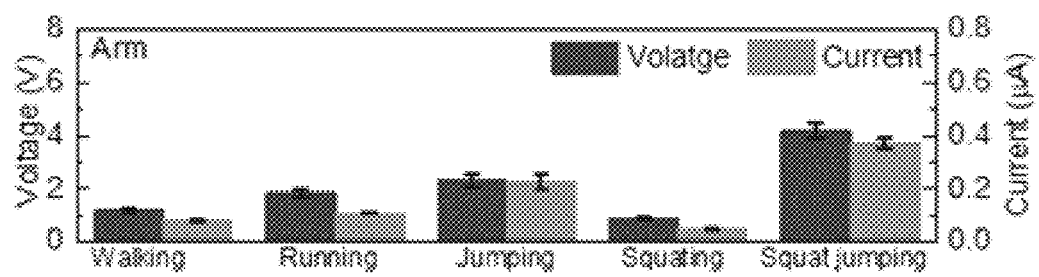
FIG. 7B shows the electrical performance of the cow-tattoo TENG mounted at arm.
Figure 7C:
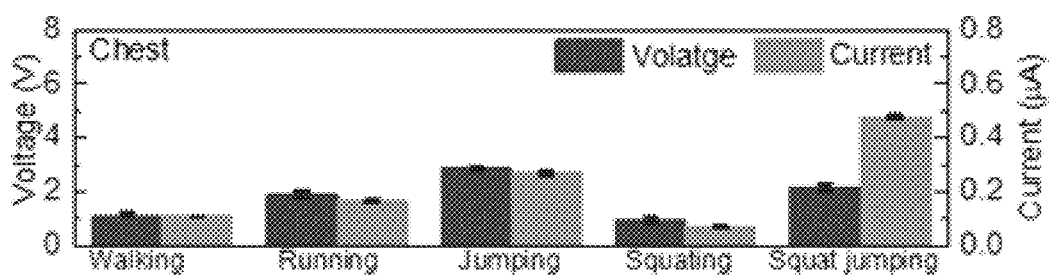
FIG. 7C shows the electrical performance of the cow-tattoo TENG mounted at chest.
Figure 7D:
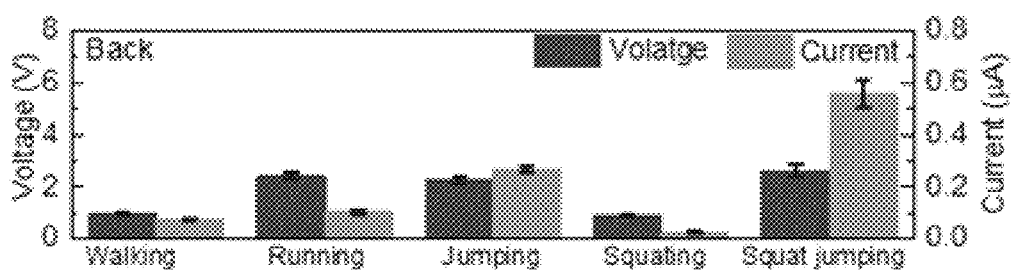
FIG. 7D shows the electrical performance of the cow-tattoo TENG mounted at back.
Figure 7E:
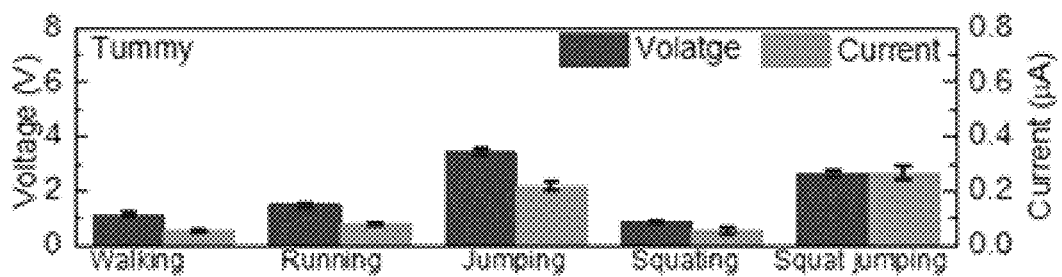
FIG. 7E shows the electrical performance of the cow-tattoo TENG mounted at tummy.
Figure 7F:
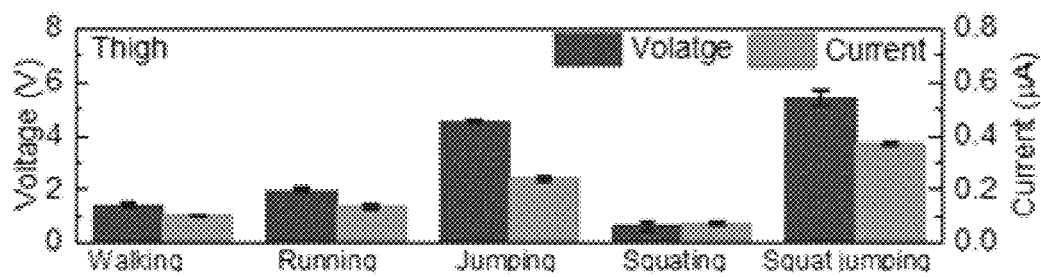
FIG. 7F shows the electrical performance of the cow-tattoo TENG mounted at tight.
Figure 8A:
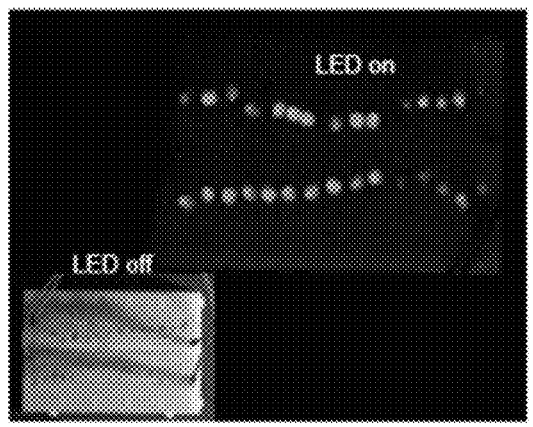
FIG. 8A shows an optical image of a tattoo-like TENG acting as the power source and turning on 50 light blubs.
Figure 8B:
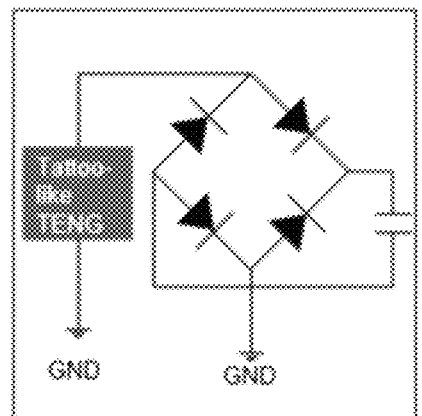
FIG. 8B shows charging circuit design for the tattoo-like TENG.
Figure 9A:
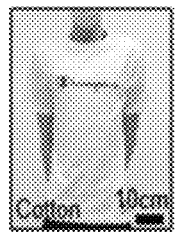
FIG. 9A shows optical images of different textile materials (cotton, polymer fiber, and nylon)
Figure 9A:
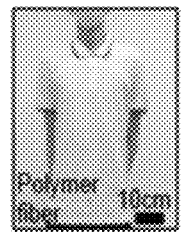
Figure 9A:
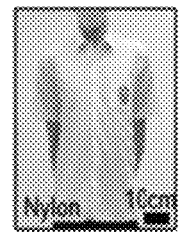
Figure 9B:
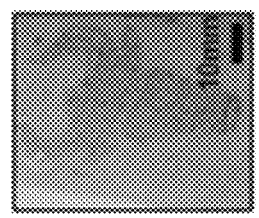
FIG. 9B shows an optical image of a cow-tattoo TENG mounted on a human shoulder.
Figure 9C:
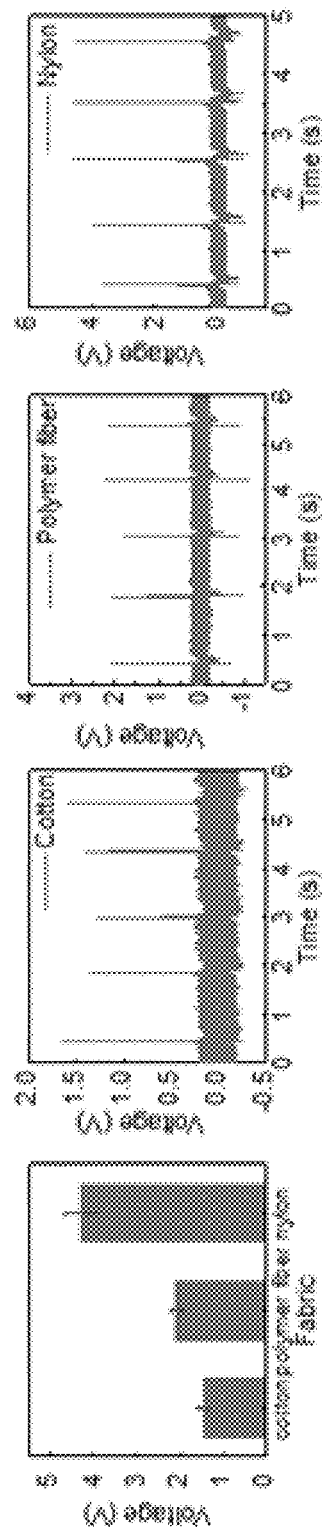
FIG. 9C shows the open-circuit voltage of the cow-tattoo TENG chafing with the different textile materials and their corresponding detailed electrical signals.
Figure 9D:
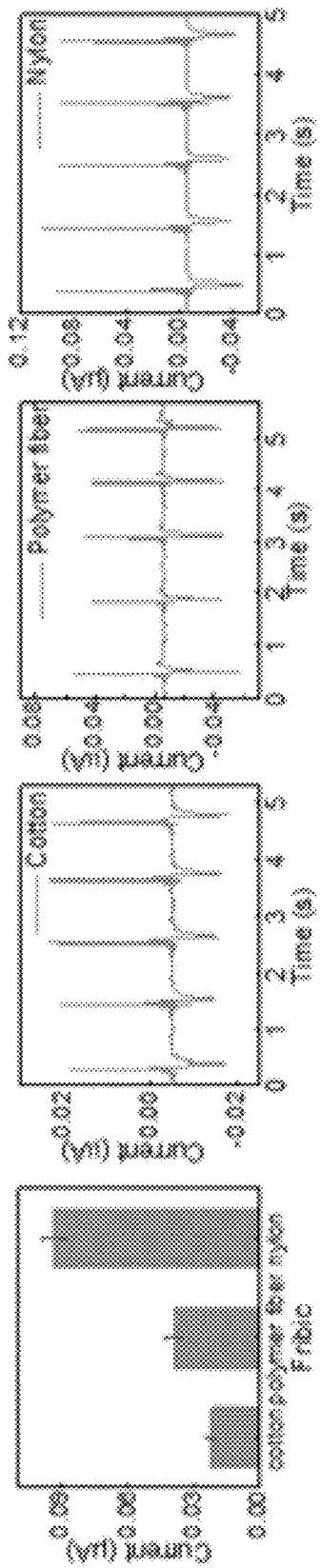
FIG. 9D shows the short-circuit current of the cow-tattoo TENG chafing with the different textile materials and their corresponding detailed electrical signals.

Furthermore, the tattoo-like TENG is applied on different body parts to test its operational performance at various movements (FIGS. 7A-7F) under different external loads. Before these tests are conducted, the cloth's material is selected. The working principle of the tattoo-like TENG is the charge transfer between the tattoo-like TENG and the cloth; the difference in the material of the fabrics would affect the output electrical signals of the tattoo-like TENG. Therefore, different textiles, including cotton, polymer fiber, and nylon, are tested (FIG. 9A). A tattoo-like TENG is mounted on the shoulder of a volunteer (FIG. 9B), and he jumps to conduct the continuous contact and separation between the cloth and the tattoo-like TENG. Among the three cloths, the nylon cloth presents the highest output open-circuit voltage (FIG. 9C) and short-circuit current (FIG. 9D) signals, further applied in other tests. Next, the volunteer wears a nylon cloth and shorts and performs different movements, like walking, running, jumping, squatting, and squat jumping (FIG. 7A). These actions cover both upper and lower limb movements to test the operational performance of the tattoo-like TENG at different body parts. The results show that there are electrical signals generated at all movements. The intensity is proportional to the intensity of the movements (FIGS. 7B-7F), where squatting shows the smallest voltage value and squat jumping offers the most significant voltage value. These prove that the tattoo-like TENG can be applied to different body parts, collect mechanical energy during different motions, and turn into electrical energy. Apart from testing the condition of energy harvesting, the intensity of the collected energy and its application is also tested. With the aid of a rectifier bridge (FIG. 8B), which turns the output AC current into DC current, the tattoo-like TENG is applied as the power source for turning on a series of LED light bulbs. Under a constant tapping motion, the tattoo-like TENG could light up over 50 LED light bulbs (FIG. 8A), which proves it is able to collect energy from body motions and act as a power source.

Although the invention has been described in terms of certain embodiments, other embodiments apparent to those of ordinary skill in the art are also within the scope of this invention. Accordingly, the scope of the invention is intended to be defined only by the claims which follow.

What is claimed is:

1. A triboelectric nanogenerator comprising:
   a first patterned polyimide (PI) film,
   a second patterned PI film;
   a patterned copper (Cu) layer sandwiched between the first patterned PI film and the second patterned PI film, the patterned Cu layer having a pattern with a shape of a Chinese zodiac, butterfly, flower or moon for providing an aesthetic outlook to the triboelectric nanogenerator;
   a polydimethylsiloxane (PDMS) film for covering the first patterned PI film; and
   an adhesion layer formed from a liquid bandage for connecting the second patterned PI film to a skin of a user.

2. The triboelectric nanogenerator of claim 1, wherein the patterned Cu layer has a serpentine structure comprising a plurality of serpentine Cu lines and a plurality of grooves, each groove being located between two respective serpentine Cu lines, the plurality of serpentine Cu lines being electrically connected and arranged to form the pattern.

3. The triboelectric nanogenerator of claim 1, wherein the first patterned PI film has a pattern same as the pattern.

4. The triboelectric nanogenerator of claim 1, wherein the second patterned PI film has a pattern same as the pattern.

5. The triboelectric nanogenerator of claim 1, wherein each of the first patterned PI film and the second patterned PI film has a pattern same as the pattern.

6. The tattoo-like triboelectric nanogenerator of claim 1, wherein the pattern covers 5% to 15% of an area of the PDMS film.

7. The triboelectric nanogenerator of claim 1, wherein the Cu layer has a thickness of 100 μm to 300 μm; the PDMS film has a thickness of 40 μm to 80 μm; and the adhesion layer has a thickness of 1 μm to 5 μm.

8. A system for energy harvesting comprising:
the triboelectric nanogenerator of claim 1; and
a cloth for providing contact and separation between the cloth and the PDMS film.

9. The system of claim 8 further comprising a rectifier bridge for electrically connecting to the patterned Cu layer via an electrically conducting wire.

10. The system of claim 8, wherein the cloth comprises cotton, polymer fiber or nylon.

11. The system of claim 8 further comprising one or more lighting device for being powered by the triboelectric nanogenerator.

12. A method for energy harvesting comprising:
providing the triboelectric nanogenerator of claim 1, wherein the triboelectric nanogenerator is mounted on a skin of a user via the adhesion layer; and
generating contact and separation between a cloth and the PDMS film under a motion of the user for turning mechanical energy from the motion into electrical energy.

13. The method of claim 12, wherein the skin is on an arm of the user, a chest of the user, a back of the user, a tummy of the user or a thigh of the user.

14. The apparatus of claim 12, wherein the motion is walking, running, jumping, squatting, squat jumping or a combination thereof.

* * * * *